United States Patent
Barnes et al.

(10) Patent No.: US 7,509,626 B1
(45) Date of Patent: Mar. 24, 2009

(54) DEMONSTRATING PROOF OF CONCEPT OF A PROJECT WITH REQUIREMENTS COMPONENT PROVIDING WEIGHTS ON IMPORTANCE AND TRACKING WITH USE CASES

(75) Inventors: James D. Barnes, Overland Park, KS (US); Robin D. Katzer, Olathe, KS (US); Dora Potluri, Plano, TX (US); M. Jeffrey Stone, Overland Park, KS (US)

(73) Assignee: Sprint Communications Company, Overland Park, KS (US)

( * ) Notice: Subject to any disclaimer, the term of this patent is extended or adjusted under 35 U.S.C. 154(b) by 852 days.

(21) Appl. No.: 10/814,422

(22) Filed: Mar. 31, 2004

(51) Int. Cl.
*G06F 9/44* (2006.01)
(52) U.S. Cl. .............. 717/101; 705/9; 705/11
(58) Field of Classification Search ......... 717/101; 705/9, 11
See application file for complete search history.

(56) References Cited

U.S. PATENT DOCUMENTS

| | | | | |
|---|---|---|---|---|
| 5,210,836 A * | 5/1993 | Childers et al. | ......... | 712/241 |
| 5,539,891 A * | 7/1996 | Childers et al. | ......... | 711/5 |
| 5,579,273 A * | 11/1996 | Childers et al. | ......... | 365/205 |
| 5,598,545 A * | 1/1997 | Childers et al. | ......... | 712/221 |
| 5,659,776 A * | 8/1997 | Chauvel | ......... | 712/22 |
| 5,671,187 A * | 9/1997 | Childers et al. | ......... | 365/205 |
| 5,694,588 A * | 12/1997 | Ohara et al. | ......... | 712/225 |
| 6,615,166 B1 * | 9/2003 | Guheen et al. | ......... | 703/27 |
| 6,715,130 B1 * | 3/2004 | Eiche et al. | ......... | 715/210 |
| 6,721,713 B1 * | 4/2004 | Guheen et al. | ......... | 705/1 |
| 6,957,186 B1 * | 10/2005 | Guheen et al. | ......... | 705/1 |

OTHER PUBLICATIONS

Rational Requisite Pro, Version 4.5, User's Guide from 1999, Whole Manual.*
Rational Rose as documented by Visual Modeling with Rational Rose, Terry Quatrani in 1998, pp. 2-12, 14-18, 20-39, 42-61, 64-74, 76-89, 107-115, 118-129, 158-162, 175-177, 216.*
Microsoft Project, User's Guide, 1995, pp. 1-35.*
Software Project Plan Tracking Intelligent Agent, Ching-She Wu, Dec. 2000, 295 pages.*
Cordes, D.W. et al., Evaluation Method for User Requirement Documents Information and Software Technology, May 1989, vol. 31, No. 4, Abstract.*
Porter, Adam et al., Empirically Guided Software Development Using Metric-Based Classification Trees IEEE Software, Mar. 1990, pp. 46-54.*

(Continued)

*Primary Examiner*—Todd Ingberg

(57) ABSTRACT

A system for demonstrating proof of concept of a project, such as a computer application, for an organization is provided. The system includes a requirements component, a use case component, a log component, and a reporting component. The requirements component maintains requirements of the organization for the project or computer application. The use case component maintains a plurality of use cases, each of the plurality of use cases are associated with at least one of the requirements. The log component track the results of the project or computer application's execution of at least some of the plurality of use cases. The log component is also operable to track at least some defects of the project identified based on executing some of the plurality of use cases. The reporting component is operable to report results for at least some of the use cases.

25 Claims, 6 Drawing Sheets

OTHER PUBLICATIONS

Costello, Rita Jean, Metrics for requirements engineering California State University, Dissertation, 1994, AAT 1360517, Abstract.*

Gyorkos, J., Measurements in software requirements specification process Microprocessing and Microprogramming, Dec. 1994, vol. 40, No. 10, Abstract.*

Robinson, Jeanne Minahan, Risk assessment in software requirements engineering George Mason University, Dissertation, 1995, AAT 9531065, Abstract.*

Jones, Capers, Strategies for managing requirements creep Computer, Jun. 1196, pp. 92-94.*

Pfahl D. et al., Using simulation to analyse the impact of software requirement volatility on prject performance Information and Software Technology, Nov. 2000, vol. 42, No. 14, pp. 267-276.*

York, Donald, An early indicator to predict requirements volatility George Mason University, Dissertation, 2001, AAT 3000445, Abstract.*

Simmons, Dick et al., Software Measurement—A visualization toolkit for project control and process improvement Hewlett-Packard Professional Books, ISBN: 01308496952.*

Wiegers, Karl E., Automating Requirements Mangement Process Impact, 1999.*

Rational.com—Product Reviews, Rational RequisitePro Product Overview and Highlights web pages Rational.com, 2000, Retrieved from Archive.org Feb. 23, 2005.*

* cited by examiner

COMMON INTEGRATION INFRASTRUCTURE SERVICES POC REQUIREMENTS

| UNIQUE REQUIREMENT IDENTIFIER | PCS | GMG | LTD | RFI REFERENCE 310 | COMMON INTEGRATION 312 SCORECARD DIMENSIONS | USE CASE 314 |
|---|---|---|---|---|---|---|
| | | | | | SYSTEM INTERFACE ADAPTER 316 | |
| C17 | H | | | 3.7.1-1, 10 | PROTOCOL CONNECTIVITY 322 | |
| C1 | H | H | | 3.7.1-1 | RDBMS 330 | SB-9 340 |
| C2 | H | H | | 3.7.1-1, 10 | CORBA 332 | SB-8 342 |
| C3 | H | H | | 3.7.1-1 | J2EE/EJB 334 | SB-1 344 |
| C4 | H | H | | 3.7.1-1 | JMS | SB-7 346 |
| | | | | | MQSERIES 338 | SB-6 348 |
| | | | | | CORE CAPABILITY 324 | |
| C5 | H | H | | 3.7.1-6, 7 | TRANSACTION SUPPORT | SB-11 |
| C6 | H | H | | 3.7.1-6, 7 | ABILITY TO INTEGRATE WITH MB | SB-14 |
| C7 | H | H | | 3.7.1-6, 7 | ABILITY TO INTEGRATE WITH SB | SB-16 |
| | | | | | CUSTOM DEVELOPMENT 326 | |
| C8 | H | | | 3.7.1-12 | TOOLKIT PROVIDED | SB-19 |
| | | | | | DEVELOPMENT 328 | |
| C9 | H | | | 3.4.1-14 | EASE OF DEVELOPMENT | SB-19 |
| | | | | | DATA TRANSFORMATION 318 | |
| | | | | | SUPPORT OF STANDARD DATA FORMATS | |
| C10 | H | H | | 3.7.2-2, 3 | XML | SB-5 |
| C11 | H | H | | 3.7.2-2, 3 | IDL | SB-5 |
| C12 | H | H | | 3.7.2-2, 3 | JAVA OBJECT | SB-5 |
| C13 | M | | | 3.7.2-2 | EASE OF DATA TRANSFORMATION LOGIC SPECIFICATION | |
| | | | | | SUPPORTS CALL-OUT TO EXTERNAL LOGIC | |
| | | | | | PROTOCOL CONNECTIVITY | |
| C14 | H | | H | 3.7.2-6 | JAVA | SB-5 |
| | | | | | TRANSACTION FALLOUT MANAGEMENT 320 | |
| C15 | H | H | | 3.7.5-1 | GRAPHICAL FALLOUT LOGIC SPECIFICATION | SB-12 |
| | | | | | GRAPHICAL SPECIFICATION OF PROCESS | |
| | | | | | SECURITY | |
| C16 | H | H | H | 3.10 | SECURITY - USER AND ACL BASED | SB-13 |

FIG. 3

| | | | |
|---|---|---|---|
| *410* *412* | *414* | *416* | |
| 6 SYSTEM INTERFACE ADAPTER (SIA) | SYSTEM INTERFACE ADAPTER WITH MQ INTERFACE | INTERFACE DEFINITION | SB1 |
| | | SYNCHRONOUS INVOCATION INTERFACE | SB8 |
| | | JAVA/RMI INTERFACE | SB11 |
| | | CAN INVOKE EXTERNAL SYSTEM INTERFACE ADAPTER | SB6 |
| | | DATA TRANSFORMATION | SB5 |
| | | MQ SERIES INTERFACE WITH SYSTEM INTERFACE ADAPTER | C4 |
| | | SUPPORT FOR FLOW SPECIFICATION | SB7 |
| 7 SYSTEM INTERFACE ADAPTER (SIA) | SYSTEM INTERFACE ADAPTER WITH JMS | INTERFACE DEFINITION | SB1 |
| | | SYNCHRONOUS INVOCATION INTERFACE | SB8 |
| | | JAVA/RMI INTERFACE | SB11 |
| | | CAN INVOKE EXTERNAL SYSTEM INTERFACE ADAPTER | SB6 |
| | | DATA TRANSFORMATION | SB5 |
| | | JMS INTERFACE WITH THE SYSTEM INTERFACE ADAPTER | C3 |
| | | SUPPORT FOR FLOW SPECIFICATION | SB7 |
| *420* 8 SIA | *418* SYSTEM INTERFACE ADAPTER WITH CORBA AND COMPLEX FLOW | *422* INTERFACE DEFINITION | SB1 |
| | | SYNCHRONOUS INVOCATION INTERFACE | SB8 |
| | | *424* JAVA/RMI INTERFACE | SB11 |
| | | *426* CAN INVOKE EXTERNAL SYSTEM INTERFACE | SB6 |
| | | *428* ADAPTER | |
| | | DATA TRANSFORMATION | SB5 |
| | | *430* CORBA INTERFACE WITH THE SYSTEM | C1 |
| | | *432* INTERFACE ADAPTER | |
| | | *434* SUPPORT FOR FLOW SPECIFICATION | SB7 |
| 9 SIA | SYSTEM INTERFACE ADAPTER WITH RDBMS | INTERFACE DEFINITION | SB1 |
| | | SYNCHRONOUS INVOCATION INTERFACE | SB8 |
| | | JAVA/RMI INTERFACE | SB11 |
| | | CAN INVOKE EXTERNAL SYSTEM INTERFACE ADAPTER | SB6 |
| | | DATA TRANSFORMATION | SB5 |
| | | DBMS INTERFACE WITH THE SYSTEM INTERFACE ADAPTER | |
| | | SUPPORT FOR FLOW SPECIFICATION | SB7 |
| 10 SIA | SYSTEM INTERFACE ADAPTER WITH J2EE/EJB | INTERFACE DEFINITION | SB1 |
| | | SYNCHRONOUS INVOCATION INTERFACE | SB8 |
| | | JAVA/RMI INTERFACE | SB11 |
| | | CAN INVOKE EXTERNAL SYSTEM INTERFACE ADAPTER | SB6 |
| | | DATA TRANSFORMATION | SB5 |
| | | SYSTEM INTERFACE ADAPTER INTERFACE (J2EE/EJB) | C2 |
| | | SUPPORT FOR FLOW SPECIFICATION | SB7 |

FIG. 4

500 — THE FOLLOWING CHART SHOWS IN DETAIL THE STATUS OF EACH USE CASE.

| UC# | USE CASE ABSTRACT | USE CASE STATUS (P/F) | DETECT # LARGE/BOLD => SEV 1 OR 2 |
|---|---|---|---|
| SB 1 | SB - RMI INTERFACE | PASS | |
| SB 2 | SB - WEB SERVICES INTERFACE | PASS | 24, 33 |
| SB 3 | SB - HTTP INTERFACE | FAIL | 3, 17 |
| SB 4 | SB - CORBA INTERFACE | FAIL | 5, 12, 14, 19, 27 |
| SB 5 | SB - DATA TRANSFORMATION | PASS | 16 |
| SB 6 | SIA - MQ SIA | PASS | 34 |
| SB 7 | SIA - JMS SIA | PASS | 7, 32 |
| SB 8 | SIA - CORBA SIA | FAIL | 5 |
| SB 9 | SIA - RDBMS SIA | PASS | 11, 25 |
| SB 10 | SIA - EJB SIA | FAIL | 20, 21 |
| SB 11 | SB - TRANS MGMT | PASS | |
| SB 12 | SB - TRANS FALLOUT | PASS | |
| SB 13 | SB - SECURITY INTG | PASS | |
| SB 14 | SB - MB INTEGRATION | FAIL | 6 |
| SB 15 | SB - AGGREGATE | PASS | |
| SB 16 | SB - PERFORMANCE | FAIL | 43, 45, 46, 47, 48, 49, 51, 52, 54 |
| SB 17 | SB - AVAILABILITY | INCOMPLETE | 9, 28 |
| SB 18 | SB - NAMING SVC INTG | PASS | |
| SB 19 | SIA - EASE OF DEVELOPMENT | PASS | |
| SB 20 | DATA TRANSFORMATION EASE OF DEVELOP. | PASS | |
| SB 21 | SB - EASE OF DEVELOPMENT | PASS | 29, 31, 36, 37, 41 |
| SB 22 | SB - EASE OF DEPLOYMENT | PASS | 8, 30, 40 |

Column headers numbered: 510, 512, 514, 516. Row SB 8 columns numbered: 518, 520, 522, 524.

USE CASE #8: SYSTEM INTERFACE ADAPTER WITH CORBA INTERFACE
BRIEF DESCRIPTION ─ 614
THIS FUNCTIONALITY ALLOWS A CLIENT APPLICATION TO USE A SERVICE PROVIDED BY A BACK-OFFICE APPLICATION THAT EXPOSES A CORBA INTERFACE.

REQUIREMENT CROSS REFERENCE ─ 616

| INTERFACE DEFINITION | SB1 |
|---|---|
| SYNCHRONOUS INVOCATION INTERFACE | SB8 |
| JAVA/RMI INTERFACE | SB11 |
| CAN INVOKE EXTERNAL SYSTEM INTERFACE ADAPTER | SB6 |
| SYSTEM INTERFACE ADAPTER CORBA INTERFACE | C1 |
| SUPPORT FOR FLOW SPECIFICATION | SB7 |

IMPORTANCE ─ 618
THE SYSTEM INTERFACE ADAPTER (SIA) IS A TECHNOLOGY ASSOCIATED WITH SERVICE BROKERING THAT ALLOWS FOR THE INTEGRATION OF BACK OFFICE APPLICATIONS WITH APPLICATIONS USING OTHER TECHNOLOGIES. THE SERVICE BROKERING ALLOWS FOR SUCH INTEGRATION VIA SIAS. A CLIENT APPLICATION MAY USE ONE TECHNOLOGY TO INTERFACE WITH A BACK-OFFICE APPLICATION SAY JAVA/RMI AND THE BACK OFFICE APPLICATION CAN EXPOSE AN INTERFACE USING DIFFERENT TECHNOLOGY, SAY CORBA.

A CORBA SIA IS PARTICULARLY IMPORTANT TO SPRINT DUE TO SPRINT'S CURRENT USE BY BACK-OFFICE APPLICATIONS AND IT'S COMPLIANCE WITH INDUSTRY STANDARD SPECIFICATIONS.

STATUS ─ 620
FAIL

REASON(S) FOR FAILURE ─ 622
POC0005: CROSSWORLDS CORBA CONNECTOR DOES NOT SUPPORT UNIONS AND SEQUENCES. THIS IMPACTS BOTH CLIENT AND SERVER SIDE CONNECTORS. MOST OF THE EXISTING INTERFACES IN SPRINT USE SEQUENCES EXTENSIVELY IN BOTH IN, OUT, IN/OUT AND RETURN VALUES. THE USE OF UNIONS IN OUR IDL INTERFACES IS MUCH SMALLER WHEN YOU COMPARE IT TO SEQUENCES.

WORKAROUND(S) IF ANY ─ 624
NEED TO MODIFY EXISTING INTERFACES TO REMOVE SEQUENCES AND INSTEAD SOMEHOW RETURN ONE DATATYPE (LIKE AN XML STRING). THIS WOULD REQUIRE A LOT OF RETOOLING OF OUR BACKEND EXISTING INTERFACES.

LEVEL OF EFFORT (LOE) FOR WORKAROUND ─ 626
N/A

*FIG. 6*

DEMONSTRATING PROOF OF CONCEPT OF A PROJECT WITH REQUIREMENTS COMPONENT PROVIDING WEIGHTS ON IMPORTANCE AND TRACKING WITH USE CASES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the evaluation of products prior to purchase. More particularly, embodiments of the present invention provide for a standard method and system for determining and documenting whether a product meets the needs it is intended to fill.

BACKGROUND OF THE INVENTION

A potential purchaser of a product may wish to evaluate the product prior to purchase to determine if the product meets its needs. The product can be subjected to a set of tests designed to stimulate the functions the product might be expected to perform in actual use conditions. A decision on whether to purchase the product can then be based on the performance of the product in the tests. These tests can be referred to as test cases or use cases. Subjecting a product to a set of use cases and basing purchasing decisions on the performance of the product in the use cases may be referred to as a proof of concept.

SUMMARY OF THE INVENTION

The present invention provides, in one embodiment, a system for demonstrating proof of concept of a project for an organization. The system includes a requirements component, a use case component, a log component, and a reporting component. The requirements component is operable to maintain requirements of the organization for the project. The use case component is operable to maintain a plurality of use cases, each of the plurality of use cases are associated with at least one of the requirements. The log component is operable to track results of the project executing at least some of the plurality of use cases. The log component is also operable to track at least some defects of the project identified based on executing some of the plurality of use cases. The reporting component is operable to report results for at least some of the use cases.

The present disclosure, according to another embodiment, provides a method of demonstrating proof of concept of a product. The method includes describing requirements to be fulfilled by the product, and generating use cases defining test scenarios to test whether the product satisfies the requirements, each of the use cases based on at least one of the requirements. The method includes describing a relationship between each use case and an associated one of the requirements, and weighting each use case based upon a priority associated with the requirement tested by the use case.

One embodiment provides a method for demonstrating proof of concept of a product. The method includes providing a project plan component identifying at least one product to test, and describing requirements to be fulfilled by the product. The method includes generating use cases defining test scenarios to test whether the product satisfies the requirements, each of the use cases are based on at least one of the requirements. The method provides for describing a relationship between each use case and an associated one of the requirements, and testing the product using the use cases. The method also includes weighting each use case based upon a priority associated with the requirement tested by the use case.

BRIEF DESCRIPTION OF THE DRAWINGS

FIG. 3 is a graphical user interface, according to one embodiment of the Proof of Concept method and system, for displaying project requirements.

FIG. 4 is a graphical user interface, according to one embodiment of the Proof of Concept method and system, for displaying use cases.

FIG. 5 is a graphical user interface, according to one embodiment of the Proof of Concept method and system, for displaying a use case log.

FIG. 6 is a graphical user interface, according to one embodiment of the Proof of Concept method and system, for displaying a defects log.

DETAILED DESCRIPTION OF THE PREFERRED EMBODIMENTS

Figure 1:
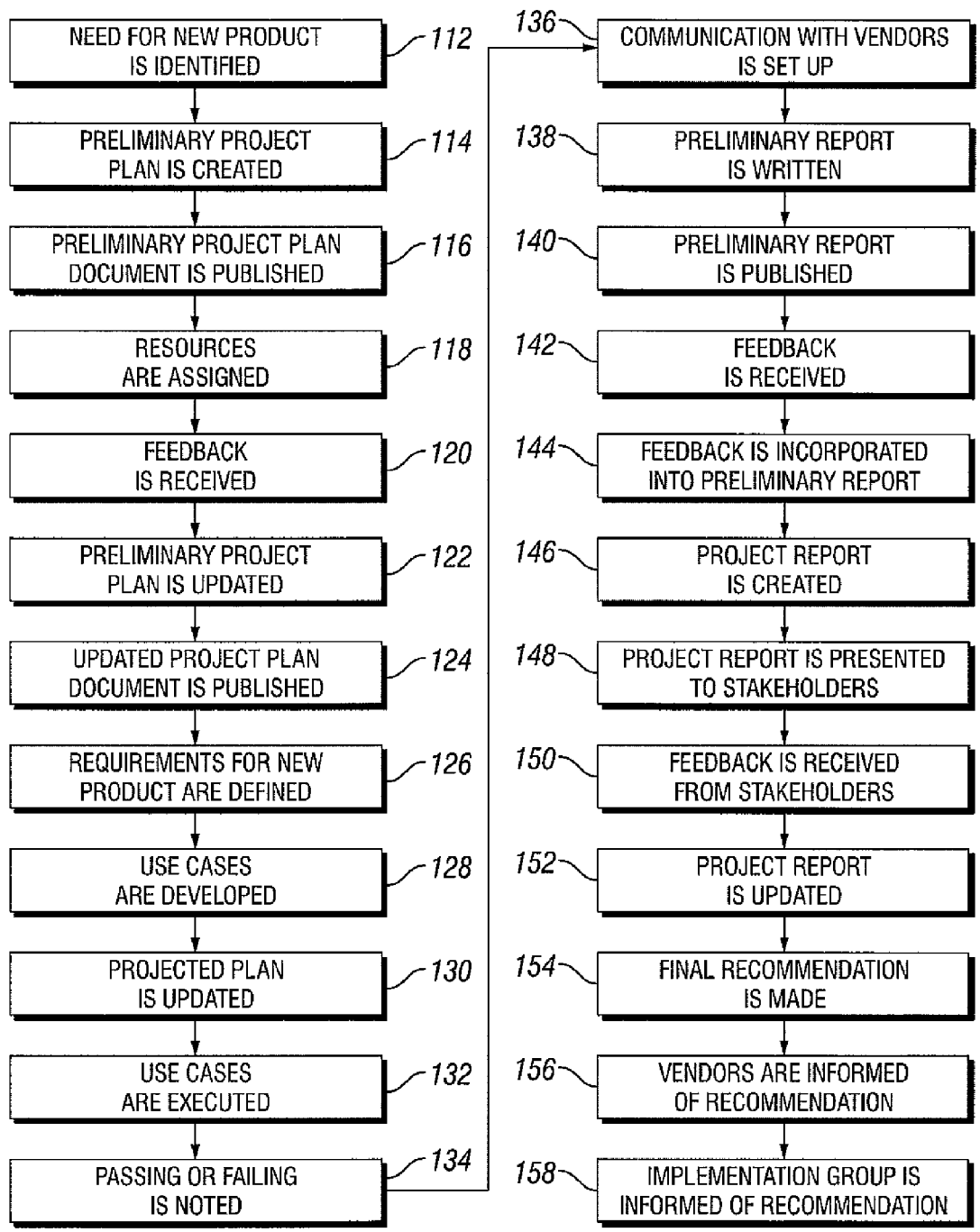
FIG. 1 is a block diagram of the Proof of Concept method according to one embodiment.

Demonstrations of proof of concept are traditionally carried out by vendors of a product at the request of potential purchasers of the product. A potential purchaser might create a set of test cases or use cases designed to evaluate the product. Multiple use cases might be created to test various aspects of the product. Several vendors of similar products might then perform the tests specified by the use cases without prior knowledge of the contents of the tests. The potential purchaser might observe the performance of the products and might choose one vendor's product based on the observations.

While general procedures such as these might be followed in demonstrating proof of concept, a standardized process might not be used. A potential purchaser might follow different procedures for different products in the creation of use cases and in the evaluation of vendors' performances in the use cases. In addition, a potential purchaser might not maintain adequate documentation to support the reasons for choosing one product over another.

In an embodiment of the method and system for demonstrating proof of concept described herein, a standard procedure is used for creating use cases, performing use cases, evaluating the results of use cases, and documenting plans for and conclusions indicated by use cases. A potential purchaser creates a project plan describing how the Proof of Concept is to be carried out. The project plan includes a set of use cases specifying the requirements the product is to meet, the tests to be performed, and the criteria for passing or failing. The potential purchaser, rather than a vendor, carries out the use cases by performing hands-on evaluations of the products that might be purchased. Results of the use cases are recorded in a use case log and in a defects log. A project report is created detailing the conclusions reached as a result of the use cases.

The Proof of Concept process typically begins when a need for a new product is identified. The need can be immediate or can relate to the long-term future direction of an enterprise. In the case of long-term needs, an enterprise might have a target state architecture that describes a desired future state of the enterprise. The Proof of Concept process can be applied to products intended to implement this target state architecture. A project plan can be created to describe the desired functionality and capabilities of the product under consideration, how the product might aid in reaching the target state or in meeting an immediate need, and how the product is to be evaluated.

The project plan can include detailed descriptions of the use cases to be used to evaluate the product. This can include descriptions of the requirements to be filled by the product, how the use cases test whether the requirements are met, the importance of each use case, and criteria for determining whether the product passed or failed each use case. The requirements can be weighted based on their priority. Groups that might be affected by the product can provide feedback to the group conducting the Proof of Concept regarding the product's potential impact and the most appropriate methods for evaluating the product. This feedback can be used to revise the project plan.

Information needed to perform a Proof of Concept, such as potential vendors, appropriate products, and estimated costs can be gathered by the group that will perform the Proof of Concept or can be provided to that group by another group within the same enterprise. Potential vendors can then be sent a Request for Information (RFI), a Request for Proposals (RFP), or some other document specifying what is expected from their product. In an embodiment, some vendors can be eliminated prior to the Proof of Concept process based on their responses to the RFI or RFP. This preliminary elimination of some vendors can be conducted by the same group that performs the Proof of Concept or by another group.

When a need has been identified, vendors whose products might fill the need have been selected, and use cases to evaluate the selected products have been created, the vendors of the products are requested to submit samples of their products. The potential purchaser then subjects the samples to the tests specified in the use cases. In an alternative embodiment, rather than a competition among multiple vendors, the Proof of Concept process can be performed to evaluate a single vendor's product. In another alternative, the Proof of Concept process can be performed on an idea or product generated internally within an enterprise.

Four general types of tests can be performed in the Proof of Concept process: functional, performance, scalability, and longevity. Functional testing determines whether or not a product achieves the results it is intended to. Performance tests deal with how well a product achieves its intended results. For example, for a software product interacting with a database, performance measurements might include lookup times, update times, lookup overhead, and message rates. Scalability testing deals with how well a product can adapt to changes in the volume of work it is requested to do. Longevity tests measure how long a product can operate without errors. As appropriate for the product under consideration, some of these tests could be eliminated or additional tests could be performed.

The results of the use case tests can be documented in a use case log, where the requirements listed in the project plan are mapped to use cases. One requirement could be mapped to one or more use cases or one use case could be mapped to one or more requirements. Notes indicating whether each use case passed or failed are maintained in the use case log. For use cases that failed, the defects that caused the failure are also listed.

The defects in the use case log are mapped to the defects log. The defects log gives detailed information on each defect such as who created the defect, when it was created, reasons for each failure, the likely impact of each failure, the level of effort that might be required to implement a workaround for the failure, the vendor's response to the defect, whether the vendor is promising a fix, and the date of the fix. In an embodiment, different levels of severity could be assigned to different defects. Also, while the use case log and the defects log have been described as separate entities, they could alternatively be a single document. As used herein, the term "document" may refer to the process or act of obtaining or capturing information, and may also refer to a printed or electronic document, file, or set of files stored as one or more hard-copy or computer files accessible singularly or as a whole by one or more means or from one or more interfaces.

When the tests conducted in the use cases are complete, the potential purchaser can review the information collected and reach a decision on which tested product is most appropriate for meeting the identified need. A project report can then be created detailing the results of the use cases and the conclusions that have been reached. Potentially impacted groups, such as the future users of the products under consideration, can provide feedback on a preliminary project report and this feedback can be incorporated into a revised project report.

An embodiment of the Proof of Concept process is illustrated in FIG. 1. It should be understood that the procedures described below do not necessarily need to occur in the order depicted in FIG. 1. Similar results could be achieved with other sequences. In addition, some of the individual procedures could be omitted without detracting from the effectiveness of the overall process.

In box 112, a need for a new product is identified. In box 114, a preliminary project plan is created to identify a product that can fill the need. In box 116, a preliminary project plan document is published to the main architects and internal peers who are likely to be impacted by the new product. Resources for determining an appropriate product are assigned in box 118. In box 120, feedback from the architects and peers regarding the preliminary project plan is received. The preliminary project plan is updated based on this feedback in box 122. In box 124, the updated project plan is published.

In box 126, the requirements to be met by the new product are defined based on the project plan and the target state architecture. In box 128, use cases are developed based on the requirements, such as using earlier use cases, test result, develop new use cases, or other information maintained by the present disclosure. The use cases detail the features to be tested, the test conditions that will be used to test the product, and the pre-conditions and post-conditions for each test. In box 130, the project plan is updated to assign use cases to resources so progress can be tracked on a regular basis.

The use cases are executed in box 132. In box 134, the passing or failing of a use case is noted in the use case log and the defect log. Defects in products or enhancements needed by products are tracked. In box 136, regular phone calls or other means of communication are set up to communicate issues with vendors.

When the use case tests are complete, a preliminary report documenting the findings and recommendations is written in box 138. In box 140, the preliminary report is published to the group that performed the use cases. In box 142, the feedback of this group is received and, in box 144, the feedback is incorporated into the preliminary report. In box 146, the project report is created with the final results of the use cases, the defects discovered, and the recommendations.

In box 148, the project report is presented to stakeholders in the new product. Feedback is received from the stakeholders in box 150 and the project report is updated based on this feedback in box 152. In box 154, a final recommendation on the product to be purchased is made. In box 156, the vendors are informed of the recommendation. A group that will implement the new product is informed of the recommendation in box 158.

Figure 2:
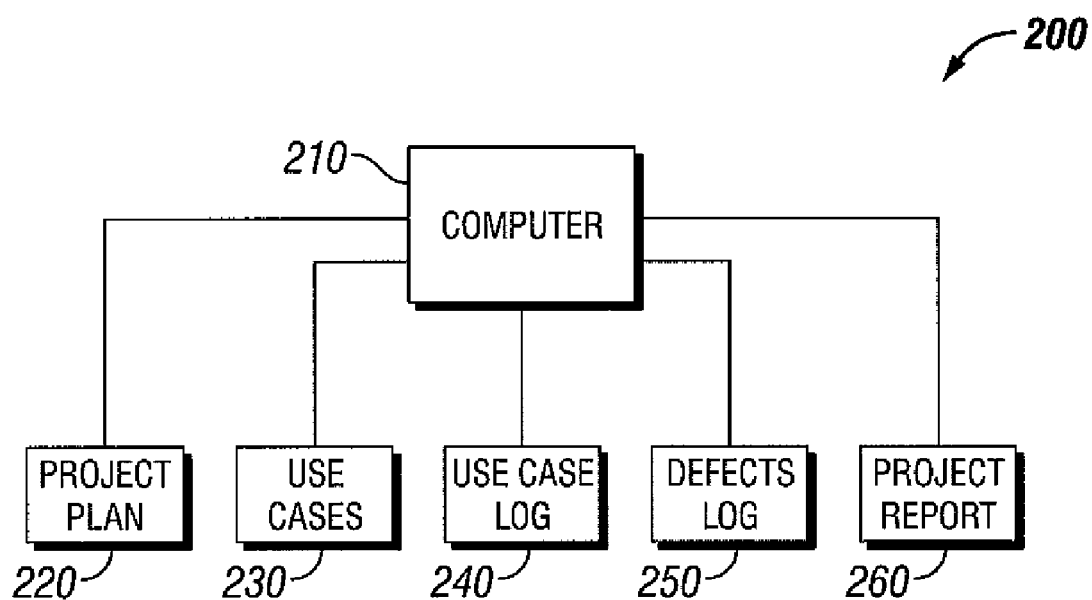
FIG. 2 is a block diagram of the Proof of Concept system according to one embodiment.

Information and documentation related to the Proof of Concept process can be stored in a computer-based system such as that shown in FIG. 2. The Proof of Concept system 200 consists of a computer 210 through which a user can create, read, update, or delete information in a project plan document 220, a document describing a set of use cases 230, a use case log 240, a defect log 250, and a project report 260. The document describing the use cases 230 might be a stand-alone document as shown in FIG. 2 or, as described above, might be a part of the project plan document 220. The use case log 240 and the defects log 250 might be separate documents as shown in FIG. 2 or might be a single document. Other embodiments of the documents, such as the combining of the use cases 230, the use case log 240, and the defects log 250 into a single document, are also possible.

An example of a product requirements section of the project plan document 220 is shown in FIG. 3. Column 310 lists reference numbers that map each requirement to a section of a Request for Information (RFI) document sent to potential vendors. Column 312 lists a set of requirements. In this case, the requirements deal with a system interface adapter 316, data transformation 318, and transaction fallout management 320. Under each general requirement 316, 318, and 320, several sub-requirements are listed. For example, under the system interface adapter requirement 316, the sub-requirements are protocol connectivity 322, core capability 324, custom development 326, and development 328. Under each sub-requirement 322, 324, 326, and 328, several specific requirements are listed. For example, under the protocol connectivity sub-requirement 322, the specific requirements are RDBMS 330, CORBA 332, J2EE/EJB 334, JMS 336, and MQSeries 338.

Each of the specific requirements listed in column 312 is mapped to a use case shown in column 314. For example, the RDBMS requirement 330 is mapped to use case SB-9 340, the CORBA requirement 332 is mapped to use case SB-8 342, the J2EE/EJB requirement 334 is mapped to use case SB-1 344, the JMS requirement 336 is mapped to use case SB-7 346, and the MQSeries requirement 338 is mapped to use case SB-6 348.

An example of a detailed list of use cases (230 in FIG. 2) is shown in FIG. 4. In column 410, the use case numbers are listed. These map to the use case numbers shown in column 314 of FIG. 3. In column 412, a set of requirements is listed. These map to the sub-requirements 316, 318, and 320 shown in FIG. 3. The only requirement shown in column 412 of FIG. 4 is 'system interface adapter', which maps to the system interface adapter sub-requirement 316 in FIG. 3. Column 414 lists a set of requirements that map to the specific requirements 330, 332, 334, 336, and 338 shown in FIG. 3. For example, the third item in column 414 is 'system interface adapter with CORBA and complex flow' 418. This corresponds to the third item in column 410, which is use case number 8 420. These two items in turn map to CORBA 332 and SB-8 342, respectively, in the requirements document shown in FIG. 3.

Column 416 lists the specific use cases intended to test the requirements shown in column 414. In the case of the 'system interface adapter with CORBA and complex flow' requirement 418, the use cases are interface definition 422, synchronous invocation interface 424, Java/RMI interface 426, can invoke external system interface adapter 428, data transformation 430, CORBA interface with the system interface adapter 432, and support for flow specification 434.

An example of a use case log (240 in FIG. 2) is shown in FIG. 5. Column 510 of the log 500 lists a series of use cases. These use cases map to the use cases shown in column 410 of FIG. 4 and in column 314 in FIG. 3. For example, use case SB-8 518 corresponds to use case 8 420 in FIG. 4 and to use case SB-8 342 in FIG. 3. Column 512 lists the titles of the corresponding use cases in column 510. For example, the title corresponding to use case SB-8 518 is SIA-CORBA SIA 520. These titles map to the requirements in column 414 in FIG. 4 and to the requirements in column 312 in FIG. 3.

Column 514 lists the pass or fail status of each use case. For example, the status of use case SB-8 518 is 'fail' 522. Column 516 lists defect numbers for each use case that has a 'fail' status. These are code numbers that cross-reference detailed explanations of each defect. For example, use case SB-8 518 has a defect code 524 of 5. A reference document can be consulted to learn more about the defect referred to by this defect code.

FIG. 6 shows an example of a detailed defects log (250 in FIG. 2). A use case 612 is listed that maps to use case SB-8 342 in FIG. 3, use case 8 420 in FIG. 4, and use case SB-8 518 in FIG. 5. A brief description section 614 describes the functionality to be tested by the use case 612. A requirement cross reference table 616 lists other requirements related to the use case 612. An importance section 618 describes the relevance of the use case 612. A status section 620 states whether the use case 612 passed or failed. A reasons for failure section 622 gives detailed explanations of the causes of a failed use case 612. A workarounds section 624 describes potential fixes for a failed use case 612. A level of effort section 626 describes the amount of work that might be needed to implement a workaround 624.

Documents such as those depicted in FIGS. 3, 4, 5, and 6 can be incorporated into a project report (260 in FIG. 2) that summarizes the use cases to which a product has been subjected, the results of the use cases, and the conclusions that have been reached based on the use case results.

In an alternative embodiment, information and documentation related to the Proof of Concept process can be incorporated into a web site. For example, the project plan, the list of use cases, the use case log, the defects log, and the project report could be published as web pages that can be viewed and updated by users of the Proof of Concept process.

It should be appreciated that a number of additional benefits may be derived by having access to the variety of use cases and test results maintained by the present disclosure. For example, in a system employing a target state architecture or targeted architecture standard, a number of requirements are likely to reoccur with some frequency since standardized components are employed throughout the enterprise. Thus, when one product is tested by various use cases, the next product to be tested may likely be able to reuse a number of the previous use cases, due to, for example, standardization of system interfaces throughout the enterprise. Further, the product may not need to be tested against a given project interfaces where the product had been previously test for the same interface for another project. Maintaining the benchmarks and/or results from the product tests and use cases creates efficiencies, since some potential products may be readily selected or eliminated based on results of previous product testing by use cases for similar systems and interfaces.

Thus, the present disclosure, according to one embodiment provides ready access to reusable use cases, as well as test results and/or benchmarks of the product performing the use cases. Also, the present disclosure provides a synergy to target state architecture enterprises by leveraging cross-project product identification, rejection and/or selection, based on information derived from the present disclosure.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

What is claimed is:

1. A system for a purchasing organization for demonstrating proof of concept of a project supplied by a vendor to be used by the purchasing organization, the system comprising:
   an executable requirements component stored on a computer readable medium, wherein, upon being executed, the requirements component maintains requirements of the purchasing organization for the project;
   an executable use case component stored on a computer readable medium, wherein, upon being executed, the use case component maintains a plurality of use cases comprising functional, performance, scalability, and longevity tests to be preformed, each of the plurality of use cases associated with at least one of the requirements, wherein each of the use cases are weighted based upon their importance;
   an executable log component stored on a computer readable medium, wherein, upon being executed, the log component tracks results of the project executing at least some of the plurality of use cases, the log component further tracks at least some defects of the project that are identified based on executing some of the plurality of use cases; and
   an executable reporting component stored on a computer readable medium, wherein, upon being executed, the reporting component reports the results to the purchasing organization for the at least some of the use cases.

2. The system of claim 1, wherein potential users of the project define at least some of the requirements maintained by the requirement component.

3. The system of claim 1, wherein each requirement has at least one use case associated with the requirement.

4. The system of claim 1, wherein the use case component further comprises a use case generator that generates the plurality of uses cases based on the requirements maintained by the requirements component.

5. The system of claim 1, wherein the test component further determines for each of the plurality of use cases whether the project satisfies one of the requirements.

6. The system of claim 1, wherein the log component tracks the results of each of the plurality of use cases and further tracks each defect of the project identified.

7. The system of claim 1, wherein the project is further defined as a software product.

8. The system of claim 1, wherein the project is further defined as a computer application.

9. The system of claim 1, wherein the reporting component maps each requirement to one of the plurality of use cases.

10. The system of claim 9, wherein at least some of the plurality of use cases includes sub-use cases and wherein the reporting component further maps each of the sub-use cases to an associated one of the requirements.

11. A method of demonstrating proof of concept of a product, the method comprising:
   describing requirements to be fulfilled by the product;
   generating use cases defining test scenarios to test whether the product satisfies the requirements, wherein each of the use cases is based on at least one of the requirements;
   describing a relationship between each use case and an associated one of the requirements;
   executing, by the product, the use cases; and
   weighting each use case based upon a priority associated with the requirement tested by the use case.

12. The method of claim 11, wherein the relationship between the use cases and the requirements is further defined as describing a manner in which each of the use cases test the requirement associated with the use case.

13. The method of claim 11, wherein at least one use case is generated for each of the requirements.

14. The method of claim 11, wherein a plurality of use cases are generated for each of the requirements.

15. The method of claim 11, further comprising:
   maintaining, by a log component, results of the product executing the use cases; and
   maintaining, by the log component, a products failure list.

16. The method of claim 15, wherein the log component includes a use case log to maintain results of the use cases, and wherein the log component further includes a defects log to maintain the product failure list.

17. The method of claim 16, further comprising reporting the results from the use case log and the defects log.

18. The method of claim 17, further comprising providing a recommendation of whether to implement the product.

19. A method for demonstrating proof of concept of a product, comprising:
   providing a project plan component identifying at least one product to test;
   describing requirements to be fulfilled by the product;
   generating use cases defining test scenarios to test whether the product satisfies the requirements, each of the use cases based on at least one of the requirements;
   describing a relationship between each use case and an associated one of the requirements;
   testing the product using the use cases; and
   weighting each use case based upon a priority associated with the requirement tested by the use case.

20. The method of claim 19, wherein the testing includes a functional test to determine whether the project achieves an intended result.

21. The method of claim 19, wherein the testing includes a performance test to measure a quality performance of the product.

22. The method of claim 19, wherein the testing includes a scalability test to measure an adaptability to work volume change of the product.

23. The method of claim 19, wherein the testing includes a longevity test to measure a length of operation of the product without errors.

24. The method of claim 19, wherein the testing includes one of a functional test, a performance test, a scalability test, and a longevity test.

25. The method of claim 19, wherein at least some of the requirement are provided by a potential user group of individuals and wherein at least some of the requirements are provided by a second group of individuals.

* * * * *